United States Patent
Underbrink et al.

(10) Patent No.: US 7,412,266 B2
(45) Date of Patent: *Aug. 12, 2008

(54) ALIGNING A FRAME PULSE OF A HIGH FREQUENCY TIMER USING A LOW FREQUENCY TIMER

(75) Inventors: Paul A. Underbrink, Lake Forest, CA (US); Michael D. Tomlinson, Aliso, CA (US); Ricke W. Clark, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/805,073

(22) Filed: May 21, 2007

(65) Prior Publication Data
US 2007/0217562 A1 Sep. 20, 2007

Related U.S. Application Data

(63) Continuation of application No. 09/164,432, filed on Sep. 30, 1998, now Pat. No. 7,236,810.

(51) Int. Cl.
*H04B 1/38* (2006.01)
*H04M 1/00* (2006.01)

(52) U.S. Cl. .................................. 455/574; 455/343.1

(58) Field of Classification Search .................. 455/502, 455/574, 343.1; 375/356; 370/503
See application file for complete search history.

(56) References Cited

U.S. PATENT DOCUMENTS

| | | |
|---|---|---|
| 5,416,435 A | 5/1995 | Jokinen et al. |
| 5,737,323 A | 4/1998 | Lansdowne |
| 5,790,941 A | 8/1998 | Peponides |
| 5,845,204 A | 12/1998 | Chapman et al. |
| 5,943,613 A | 8/1999 | Wendelrup et al. |
| 6,009,319 A | 12/1999 | Khullar et al. |
| 6,029,061 A | 2/2000 | Kohlschmidt |
| 6,728,234 B1 | 4/2004 | Hofmann et al. |
| 7,236,810 B1 * | 6/2007 | Underbrink et al. .......... 455/574 |
| 2005/0043068 A1 | 2/2005 | Shohara et al. |

* cited by examiner

*Primary Examiner*—Nguyen Vo
(74) *Attorney, Agent, or Firm*—Farjami & Farjami LLP

(57) ABSTRACT

A low frequency timing circuit is used to reestablish a timing signal in a high-frequency timing circuit after the high frequency timing circuit has lost and regained power. The timing of the low frequency circuit is measured against the timing of the high frequency circuit before the high frequency circuit has lost power. The low frequency circuit then is used to measure time after the high frequency circuit has lost power. Once the high frequency circuit has regained power, its timing signal is reestablished at an appropriate time based on a time measurement obtained from the low frequency circuit.

6 Claims, 4 Drawing Sheets

ALIGNING A FRAME PULSE OF A HIGH FREQUENCY TIMER USING A LOW FREQUENCY TIMER

This application is a continuation of U.S. patent application Ser. No. 09/164,432, filed Sep. 30, 1998 now U.S. Pat. No. 7,236,810, which is hereby incorporated by reference in its entirety.

TECHNICAL FIELD

The invention relates to electronic timers and, more particularly, to the use of a low frequency timer to restore timing to a high frequency timer.

BACKGROUND

Electronic timers are indispensable in many electronics applications, especially those involving digital communications. In many digital wireless communication systems, for example, a mobile station (MS) that communicates with a base station must be synchronized to the timing of the base station to ensure that the MS will receive all signals addressed to it. Typically, a high frequency oscillator in the MS drives a timing circuit that monitors the received radio-frequency (RF) channels at appointed times for control signals from the base station. Conventional wireless stations require the high frequency oscillator and the timing circuitry to operate almost constantly, even when the MS is in sleep mode, during which power is removed from the receiver circuitry to extend the life of the station's power supply. This is true even though the MS, while in sleep mode, must be active only for short, predetermined time periods to receive paging signals from the base station. In a global system for mobile (GSM) network, for example, the MS may remain in sleep mode for all but 18.5 ms during each time period of 2.2 seconds.

In a typical MS, the high frequency timing circuitry consumes a relatively large portion of the power provided by the station's power supply, often exceeded only by the power consumed by the receiver circuitry. Because a MS may spend most of its time in sleep mode, the high frequency timing circuitry often is the most critical component in determining the life of the station's power supply.

SUMMARY

The present invention was developed, at least in part, to reduce the amount of power consumed by a wireless station while in sleep mode, and therefore to improve the longevity of the station's power supply. A wireless station that implements the invention can shut down its high frequency timer, in addition to its receiver circuitry, while in sleep mode. A timing circuit driven by a low frequency oscillator, which consumes much less power than the high frequency oscillator, can be calibrated against the high frequency oscillator before the station enters sleep mode. The low frequency oscillator then may be used to restore the timing of high frequency timer circuitry when the MS leaves the sleep mode.

In some implementations, the calibration process may utilize a known time period defined by a given number of pulses of the high frequency clock. For example, the calibration period in a GSM station may be determined by the period between some number of frame pulses, which are generated every 4.615 ms in a typical GSM network. Counting circuitry can be used to monitor the number of low frequency clock pulses during the calibration period, as well as the number of high frequency clock cycles that occur during any partial cycle of the low frequency oscillator that falls within the calibration period. In this manner, the time bias and frequency of the low frequency timer can be determined to the accuracy of the high frequency clock.

When the MS enters sleep mode, the station can calculate the number of low frequency clock cycles that must pass before power is restored. Power then may be removed from all circuitry in the MS except the low frequency timing circuitry. If the frequency of the low frequency oscillator is sufficiently stable over short time periods (e.g., exhibiting a drift of only a few microseconds during each 2.2 second sleep period), the time at which the MS is to exit the sleep mode can be determined with sufficient accuracy. Upon exiting sleep mode, the MS restores power to the high frequency timing circuitry and adjusts the timing of the high frequency timing circuitry based on the timing of the low frequency oscillator.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
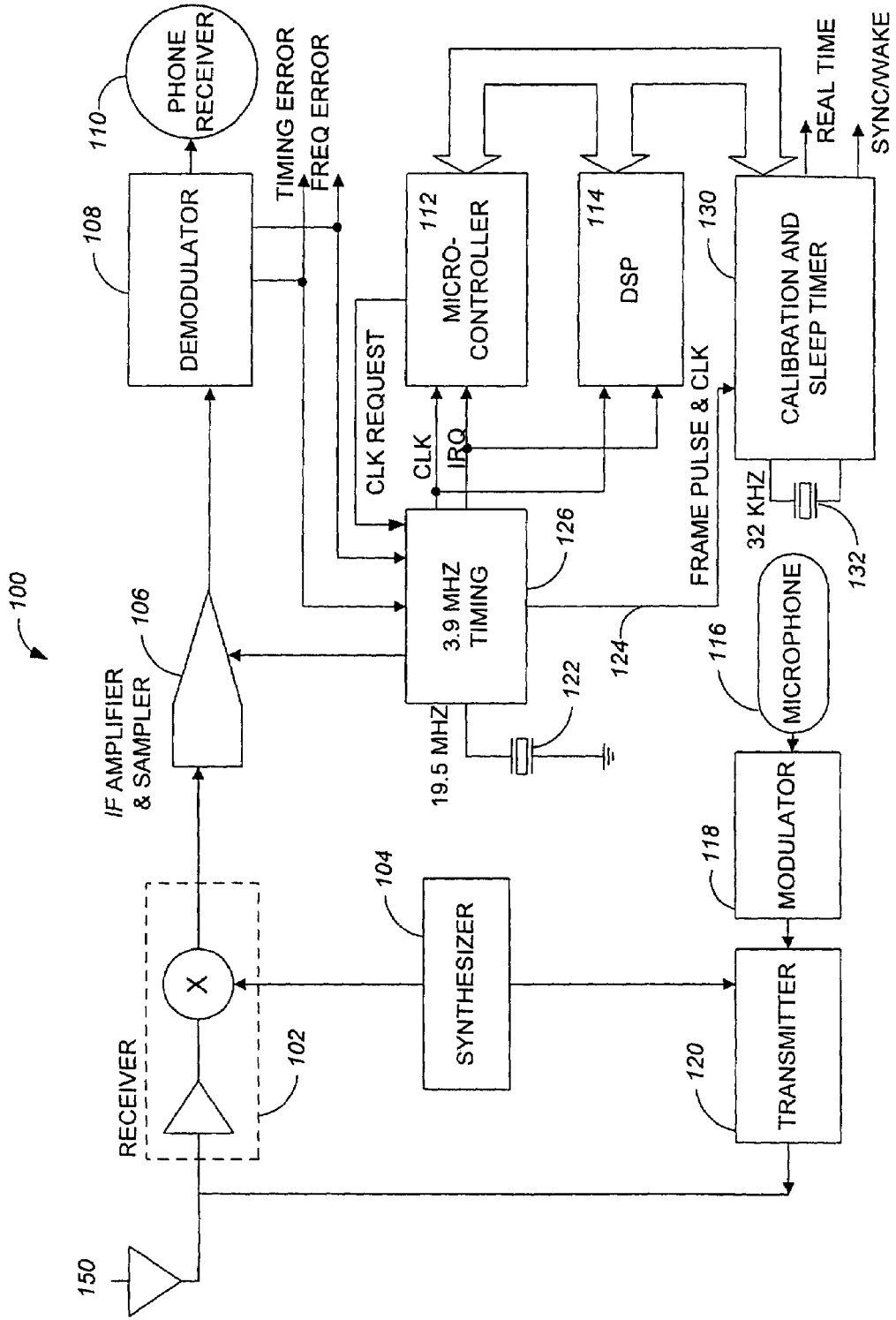
FIG. 1 is a functional block diagram of a mobile station having a low frequency timing circuit that provides timing for the mobile station while the mobile station is in sleep mode.

FIG. 1 shows a wireless mobile station (MS) 100. The MS 100 receives a radio-frequency (RF) signal from a base station via an antenna 150 and an RF receiver 102. The receiver mixes the received RF signal with a locally generated oscillating signal, which it receives from a frequency synthesizer 104, to produce an intermediate frequency (IF) signal. An IF amplifier 106 receives and amplifies the IF signal and provides the signal to a demodulator 108, which converts the IF signal into an audible-sound signal. A phone receiver 110 (e.g., an earpiece) in the mobile station delivers the sound signal to a user.

The MS 100 includes a microcontroller 112 and a digital signal processing (DSP) module 114 that, among other things, ensure the timing accuracy of the high frequency timer 126. The MS also includes transmitting circuitry, including a modulator 118 and an RF transmitter 120, that modulates and transmits a signal from a sound source, such as a microphone 116 in the MS.

The high frequency timer 126 provides high frequency (e.g., 3.9 MHZ) clock pulses. A high frequency (e.g., 19.5 MHZ) oscillator 122 drives the high frequency timer 126. In a GSM station, the high frequency oscillator must be accurate to within 0.1 parts-per-million (ppm) of the base station frequency. The high frequency timer 126 also generates frame pulses, which together synchronize the MS with a base station in the wireless network. In a GSM station, the high frequency timer 126 generates a frame pulse once every 4.615 ms. In addition to these timing pulses, the high frequency timer generates interrupt signals for the microcontroller 112 and the DSP module 114.

A low frequency timing circuit 130 driven by a low frequency (e.g., 32 kHz) crystal oscillator 132 provides secondary timing for the MS 100. The primary functions of the low frequency timer are to keep track of real time, even after the user has shut off the main power supply of the MS, and to provide a "wake-up" signal to bring the MS out of the low-power sleep mode.

The low frequency timer 130 receives each frame pulse 124 from the high frequency timer 126 and calibrates itself against the frame pulse to compensate for drift in the frequency of the low frequency oscillator 132. This calibration process occurs over many frame pulses to reduce the effects of slow variations in the frequency of the low frequency oscillator 132. Once calibrated, the short term accuracy of the low frequency timer 130 is essentially as good as that of the high frequency timer 126, so that the low frequency oscillator 132 can be used to provide timing signals in the MS when the remaining circuitry, including the high frequency timer 126, is in sleep mode. During sleep mode, the low frequency timer 130 determines when the receiver circuitry 102 must become active to receive the next paging signal from the base station and generates a wake-up signal at the appropriate time.

Figure 2:
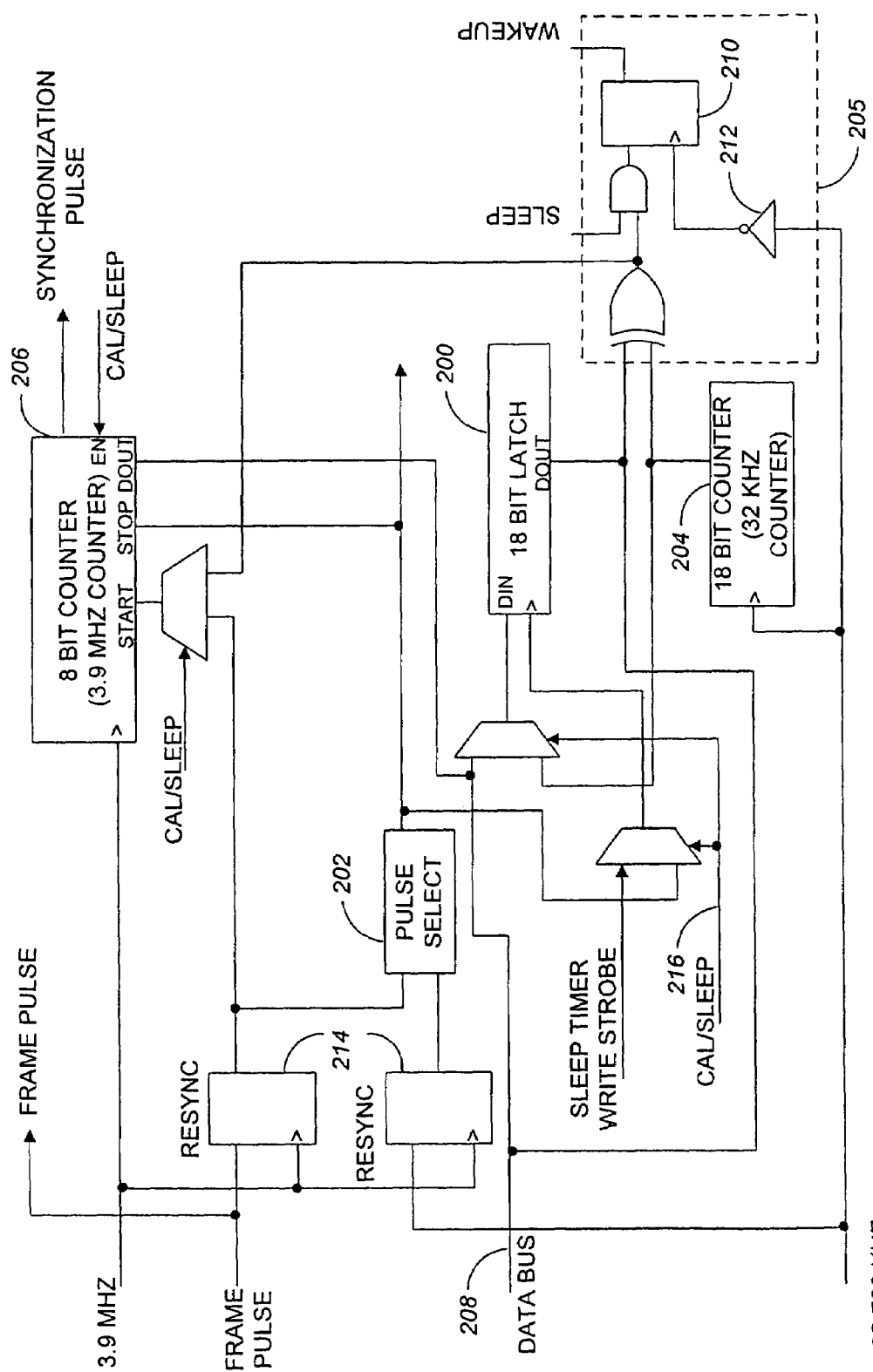
FIG. 2 is a detailed block diagram of the low frequency timing circuitry.

FIG. 2 is a detailed block diagram of the low frequency timer 130. When the MS 100 is not in active mode, the microcontroller 112 and the DSP module 114 provide certain information to the low frequency timer 130 on a data bus 208. This information includes a "Calibration/Sleep" control bit and a sleep-mode duration counter value ($N_{wakeup}$), which is described in more detail below. The high frequency timer 126 supplies high frequency clock pulses and the frame pulse signal 124 to the low frequency timer 130. A "resynch" circuit 214 receives the high frequency clock pulses, the frame pulse signal, and the low frequency clock pulses and synchronizes the rising edges of these signals with respect to each other. A high frequency counter circuit 206 (e.g., an 8-bit counter) counts the high frequency clock pulses, beginning at a rising edge of the synchronized frame pulse signal 124 and stopping at the next rising edge of the low frequency clock signal. The counter 206 provides an output value $P_j$ representing the offset of the $j^{th}$ frame pulse with respect to the low frequency clock in terms of the number of high frequency clock pulses.

A low frequency counter circuit 208 (e.g., an 18-bit counter) continuously counts the low frequency clock pulses, providing an output value $N_j$ that represents the state of the low frequency counter at the frame marked by the $j^{th}$ frame pulse. The low frequency counter 204 provides the output value $N_j$ to the data input of a data latch circuit 200. A pulse select circuit 202 receives the synchronized frame pulse and low frequency clock signals from the resynch circuit 214 and uses the synchronized low frequency clock signal to trigger the data latch circuit 200, causing the data latch circuit 200 to load the value $N_j$ provided by the low frequency counter 204.

During sleep mode, the low frequency counter 204 and the data latch circuit 200 act in concert with a digital logic circuit 205 to generate the wake-up signal that causes the MS to exit sleep mode. In particular, the digital logic circuit 205 generates the wake-up signal when the value provided by the counter 204 reaches the value ($N_{wakeup}$) stored in the latch circuit 200. An inverter 212 in the digital logic circuit 205 ensures that the wake-up signal does not appear until the next falling edge of the low frequency clock signal, which allows any glitches to ripple through the counters.

Figure 3:
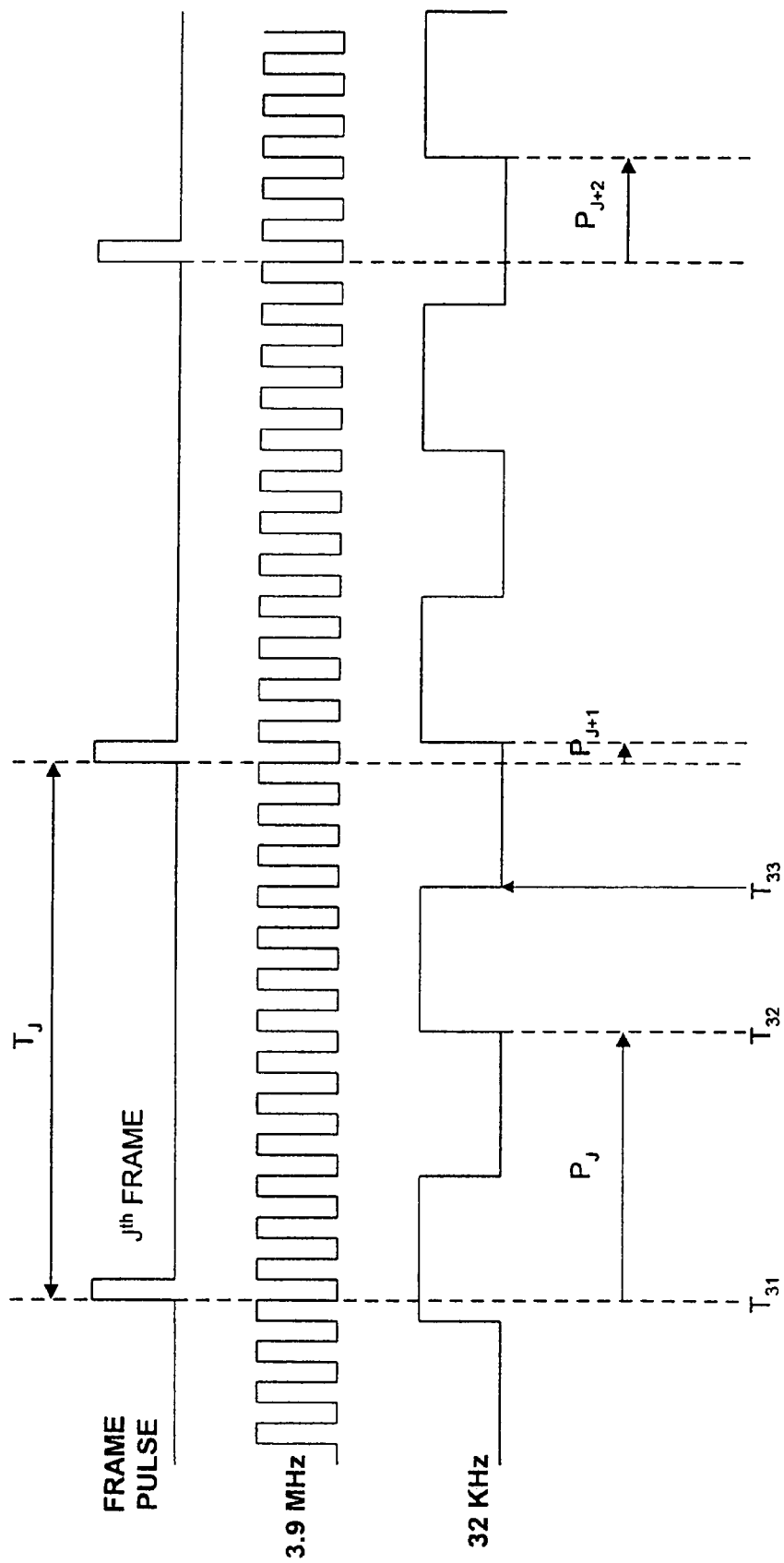
FIG. 3 is a timing diagram for calibration of the low frequency timer using a frame pulse and a high frequency clock.

FIG. 3 is a timing diagram for calibration of the low frequency oscillator using the frame pulse and the high frequency clock signals. The high frequency counter 206 begins counting high frequency clock pulses on a rising edge of the frame pulse signal ($T_{31}$) and stops counting on the next rising edge of the low frequency clock signal ($T_{32}$). After the high frequency counter 206 stops counting high frequency pulses, the value $N_j$ stored in the low frequency counter 204 is provided to the data latch circuit 200 on the next falling edge of the low frequency clock signal ($T_{33}$). At this time ($T_{33}$), the values $P_j$ and $N_j$ are available to the microcontroller which performs the calibration. One form of calibration is defined by the equations:

$$T_j = T_B + N_j T_L - P_j T_H + \epsilon, \text{ and} \quad (1)$$

$$T_k = T_B + N_k T_L - P_k T_H + \epsilon,$$

where $T_j$=the calibrated time of arrival of the $j^{th}$ frame pulse,
$T_k$=the calibrated time of arrival of the $k^{th}$ frame pulse,
$T_B$=a bias relating $T_j$ or $T_k$ to some arbitrary reference epoch, e.g., zero$^{th}$ frame pulse
$P_j$=the high frequency clock cycles at the $j^{th}$ epoch measurement,
$N_j$=the low frequency clock cycle count at the $j^{th}$ epoch measurement,
$P_k$=the high frequency clock cycles at the $k^{th}$ epoch measurement,
$N_k$=the low frequency clock cycle count at the $k^{th}$ epoch measurement,
$T_L$=the calibrated period of the low frequency oscillator,
$T_H$=the calibrated period of the high frequency oscillator, and
$\epsilon$=error terms including clock quantization and thermal noise.

If the estimates of the timing of the frame pulses $T_j$ and $T_k$ and the period of the high frequency oscillator $T_H$ are known from measurements of the received RF signal, ignoring the errors $\epsilon$, it is possible to solve equation (1) for $T_B$ and $T_L$:

$$T_L = (T_k - T_j) + [(P_k - P_j)/(N_k - N_j)] T_H \quad (2)$$

$$T_B = T_j - N_j T_L + P_j T_H$$

These approximations serve as initial estimates, and in practice the calibration must be continuously updated to account for drift in the oscillator apparatus. The calibration accuracy can be improved by averaging consecutive measurements in a tracking filter such as a Kalman filter. In this way, the effects of the errors $\epsilon$ can be minimized. In some cases higher order terms such as the first derivative of $T_L$ may be required to achieve the desired accuracy.

The difference ($N_k - N_j$) and also $T_B$ are adjusted for possible rollover of the low frequency counter, which is never reset. Also, the high frequency counter does not need to run continuously to perform calibration, as long as the frame epoch time can be determined with respect to the base station by receiving the signal periodically as in a sleep cycle.

Figure 4:
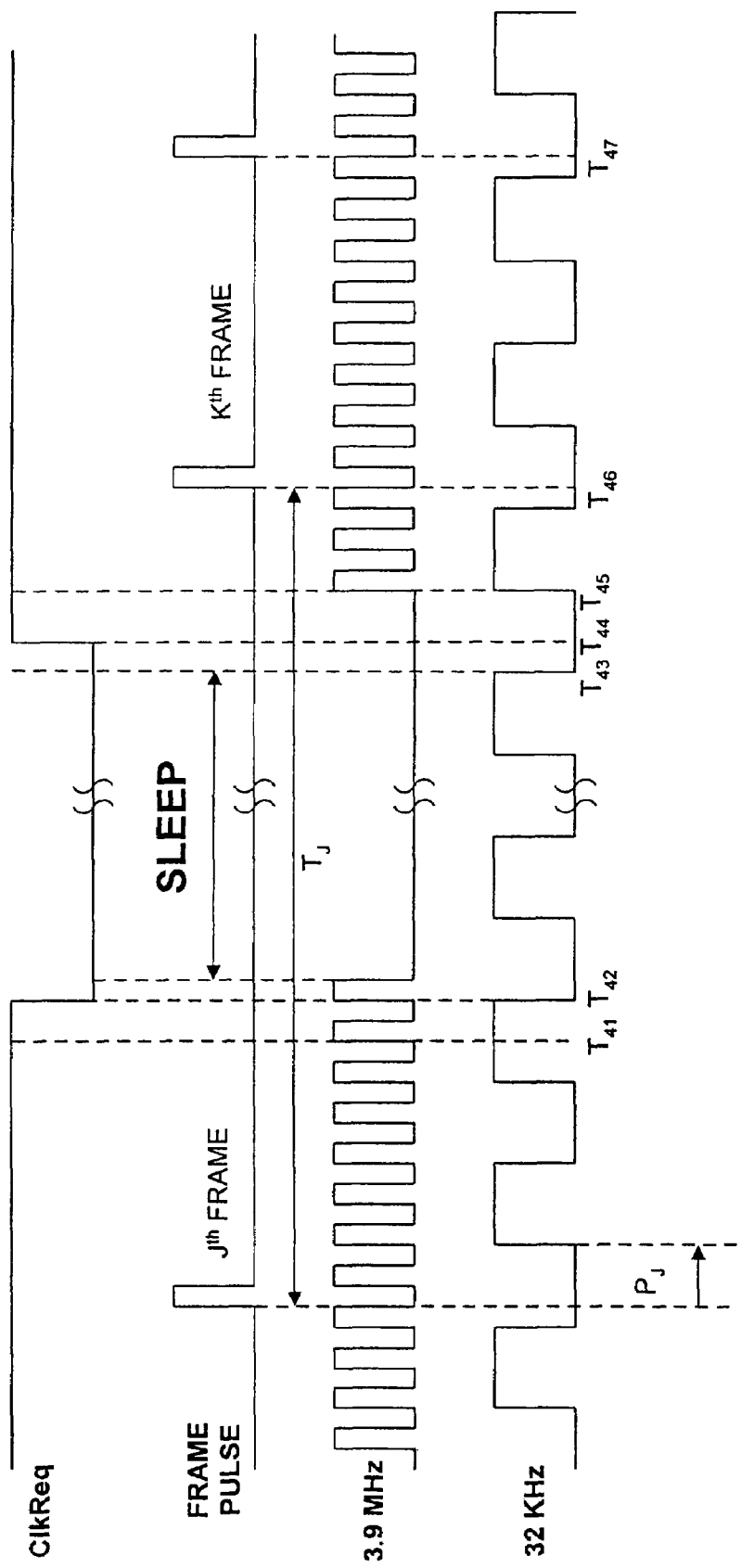
FIG. 4 is a timing diagram for operation of the timers before, during, and after sleep mode.

FIG. 4 is a timing diagram for operation before, during, and after sleep mode. Just before entering sleep mode, the microcontroller calibrates the low frequency timer, as described above, and stores the frame number in a nonvolatile memory. The microcontroller also calculates the value $N_{wakeup}$ and loads this value into the data latch circuit. The value $N_{wakeup}$ indicates the state of low frequency counter when the wake-up signal should be generated to bring the MS out of sleep mode. Since the microcontroller knows when the next frame pulse should occur, it can compute the value $N_{wakeup}$ from equation (1) above.

The low frequency timer should generate the wake-up signal early enough to allow the MS circuitry to power up sufficiently before the desired frame pulse. For example, the high frequency oscillator requires several clock cycles to recover fully from sleep mode. Moreover, the high frequency timer should be resynchronized to the frame pulse before the receiver circuitry can receive the paging signal from the base station. The lag time allowed to perform these tasks should remain as short as possible so that the MS may remain in sleep mode as long as possible to minimize power consumption.

Once the value of the low frequency counter is loaded into the data latch circuit ($T_{41}$), the microcontroller issues a signal that leads to the removal of power from the MS circuitry. The microcontroller then forces a "Clock Request" signal (ClkReq) to an inactive low value ($T_{42}$) which causes the high frequency oscillator to become inactive. At this point, the MS is in sleep mode, and only the low frequency timer and the microcontroller remain active. The low frequency counter continues to count low frequency clock pulses as the MS circuitry recovers from sleep mode.

Once the low frequency counter has reached the value $N_{wakeup}$ stored in the data latch circuit, the low frequency timer generates the wake-up signal on the next falling edge of the low frequency clock signal ($T_{43}$). The microcontroller responds to the wake-up signal by reasserting the clock request signal (ClkReq) and restoring power to the MS circuitry ($T_{44}$). The microcontroller resumes full operation as soon as the high frequency clock signal becomes available ($T_{45}$). The microcontroller then switches the low frequency timing circuitry to calibration mode and instructs the high frequency counter to generate a frame pulse.

Because the high frequency timing circuitry is inactive during sleep mode, the first frame pulse generated by the IF amplifier upon exiting sleep mode ($T_{46}$) is not synchronized with the base station. To synchronize the frame pulse signal, the microcontroller calculates the actual time of arrival of the first frame pulse from equation (1). The microcontroller then determines the time offset required to synchronize the frame pulse signal. Upon doing so, the microcontroller reprograms the high frequency counter to generate the next frame pulse at the appropriate time ($T_{47}$), after which the MS is ready to demodulate the RF signal.

The demodulator 108, upon receipt of the IF signal, produces estimates of the timing error and frequency error of the high frequency counter. These values, together with the values $P_j$ and $N_j$ from the calibration circuit, are used by the microcontroller to update the low frequency counter calibration.

In alternative embodiments, the low frequency counter 204 and the high frequency counter circuit 206 of FIG. 2 can be used to generate a synchronization pulse that immediately aligns the frame pulse generated by the high frequency timing circuit. When the microcontroller 112 generates the value $N_{wakeup}$, described above, the microcontroller also calculates a time offset between the time at which the wake up signal is to be generated and the time at which the next frame pulse is to occur. The microcontroller then determines how many cycles of the high frequency clock will occur during this time offset and subtracts this number from the maximum value to which the high frequency counter 206 can count. The microcontroller stores the resulting count value in the high frequency counter 206.

When the low frequency counter 204 reaches the value $N_{wakeup}$, the wake up signal causes the high frequency counter 206 to begin counting. The high frequency counter outputs a synchronization pulse when it reaches its overflow limit, i.e., after the time offset described above has elapsed. The presence of the synchronization pulse triggers the generation of a frame pulse signal in the high frequency timing circuit that is aligned with the frame pulse produced by the base station.

Alternatively, the calibration process may use a high speed timing circuit that is not precisely calibrated, but for which the offset can be determined from measurements of the apparent time of arrival of an RF signal with respect to the timing of the high speed timing circuit. For example, in a Global Positioning System (GPS), the time bias of the high frequency timing circuit may be known to within a few nanoseconds or less. Counting circuitry can be used continuously to make repeated time bias measurements in terms of cycles of the low frequency clock and cycles of the high frequency clock that occur during any partial cycle of the low frequency clock relative to an arbitrary epoch, the phase of which is known precisely in terms of GPS system time. In this manner, by averaging a large number of measurements, the time bias, and drift (frequency error), and possibly higher order terms (i.e., rate of change of frequency) of the low frequency oscillator can be determined with respect to GPS system time. The GPS station then can enter a sleep mode to save power.

In further alternative embodiment, the synchronization pulse is used to support means for automatic recovery of time, day, and date information from a base station.

A number of embodiments of the present invention have been described. Nevertheless, it will be understood that various modifications may be made without departing from the spirit and scope of the invention. For example, while the invention has been described in terms of a GSM-based mobile station, the invention may be implemented in virtually any type of electronic device having two timing circuits. Accordingly, other embodiments are within the scope of the following claims.

What is claimed is:

1. A method for use by a mobile station to synchronize a high frequency timing circuit to a frame pulse produced by a base station in a wireless network, the method comprising:

calibrating a timing of a low frequency timing circuit against a timing of the high frequency timing circuit;

calculating a time offset between a next time a wake up signal is to be generated by the low frequency timing circuit and a next time the frame pulse is to occur;

entering the high frequency timing circuit into a sleep mode;

waking up the high frequency timing circuit from the sleep mode in response to the wake up signal generated by the low frequency timing circuit;

generating a synchronization pulse using the high frequency timing circuit based on the time offset after the waking up; and triggering a frame pulse signal in the high frequency timing circuit using the synchronization pulse, wherein the frame pulse signal is aligned with the frame pulse.

2. The method of claim 1 comprising:

using the synchronization pulse to recover time information from the base station.

3. The method of claim 1 comprising:

using the synchronization pulse to recover date information from the base station.

4. A mobile station comprising:

a high frequency timing circuit;

a low frequency timing circuit;

a calibration circuitry configured to calibrate a timing of the low frequency timing circuit against a timing of the high frequency timing circuit;

a control circuitry configured to calculate a time offset between a next time a wake up signal is to be generated by the low frequency timing circuit and a next time the frame pulse is to occur;

wherein the high-frequency timing circuit is further configured to wake up from asleep in response to the wake up signal generated by the low frequency timing circuit, and wherein the high frequency timing circuit is configured to generate a synchronization pulse based on the time offset after waking up, and wherein the high frequency timing circuit is configured to trigger a frame pulse signal using the synchronization pulse, wherein the frame pulse signal is aligned with the frame pulse.

5. The mobile station of claim 4, wherein the mobile station uses the synchronization pulse to recover time information from the base station.

6. The mobile station of claim 4 wherein the mobile station uses the synchronization pulse to recover date information from the base station.

* * * * *